(12) United States Patent
Cha et al.

(10) Patent No.: US 8,353,267 B2
(45) Date of Patent: Jan. 15, 2013

(54) PISTON FOR ENGINE HAVING STABLE BEHAVIOR OF PISTON RING

(75) Inventors: Soon Chang Cha, Incheon (KR); Eui Seon Song, Seoul (KR)

(73) Assignee: Doosan Infracore Co., Ltd., Incheon (KR)

( * ) Notice: Subject to any disclaimer, the term of this patent is extended or adjusted under 35 U.S.C. 154(b) by 271 days.

(21) Appl. No.: 12/855,041

(22) Filed: Aug. 12, 2010

(65) Prior Publication Data

US 2011/0036322 A1    Feb. 17, 2011

(30) Foreign Application Priority Data

Aug. 12, 2009  (KR) .................. 10-2009-0074081
Jun. 8, 2010    (KR) .................. 10-2010-0053844

(51) Int. Cl.
    *F02F 3/00*    (2006.01)
(52) U.S. Cl. ..................................... 123/193.6
(58) Field of Classification Search .............. 123/193.6, 123/193.4; 92/158, 159
    See application file for complete search history.

(56) References Cited

U.S. PATENT DOCUMENTS

| | | | | |
|---|---|---|---|---|
| 4,138,984 | A | * | 2/1979 | Steidle et al. ............. 123/193.6 |
| 4,383,509 | A | * | 5/1983 | Bauer ........................ 123/193.6 |
| 5,323,744 | A | * | 6/1994 | Kusama et al. ............ 123/193.6 |
| 2003/0075137 | A1 | * | 4/2003 | Gaiser ........................ 123/193.6 |

FOREIGN PATENT DOCUMENTS

| | | |
|---|---|---|
| GB | 1584087 | 2/1981 |
| GB | 2268244 A | 5/1994 |
| JP | 2001214804 A | 8/2001 |
| JP | 2001214805 A | 8/2001 |
| SU | 723200 A1 | 3/1980 |

OTHER PUBLICATIONS

Extended European Search Report dated Nov. 29, 2010 for European application 10008169.4, filed Aug. 5, 2010.

* cited by examiner

*Primary Examiner* — M. McMahon
(74) *Attorney, Agent, or Firm* — John D. Veldhuis-Kroeze; Westman, Champlin & Kelly, P.A.

(57) ABSTRACT

Disclosed is a piston for an engine having a stable behavior of a piston ring. The piston for the engine includes: an upper ring, a middle ring, and an oil ring, provided in an outer circumferential portion; and a ring-shaped groove formed between the upper ring, and the middle ring, wherein the ring-shaped groove has a deep portion which has a concave shape, a straight-line shaped first gap is formed between a liner of a cylinder, and an area from the ring-shaped groove to the middle ring, and the first gap is larger than a gap between the liner of the cylinder, and an area from a portion provided with the upper ring to the ring-shaped groove. In the disclosed piston, a blow-by gas, which is a mixed gas flowed into a crank case from a combustion chamber by passing through a gap between the cylinder and the piston, formed below the ring-shaped groove, is stabilized, thereby stabilizing the behavior of the upper ring and the middle ring. Also, the amount of oil scraped off toward the combustion chamber is reduced, and the oil can be smoothly scraped off toward the crank case, which reduces the consumption of oil remaining and evaporating on an inner wall of the cylinder.

12 Claims, 7 Drawing Sheets

FIG. 1
Prior Art

<Specification 1>

FIG. 2
Prior Art

<Specification 1>

<Specification 2>

FIG. 6

<Specification 2>

FIG. 7

PISTON FOR ENGINE HAVING STABLE BEHAVIOR OF PISTON RING

FIELD OF THE DISCLOSURE

The present disclosure relates to a piston for an engine having a stable behavior of a piston ring. More particularly the present disclosure relates to a piston for an engine having a stable behavior of a piston ring on which a blow-by gas passing through between a cylinder and the piston has an effect.

BACKGROUND OF THE DISCLOSURE

As generally known in the art, a piston for an internal combustion engine performs a role of compressing air provided to a cylinder through reciprocation within the cylinder, and transferring expansion pressure caused by the air and fuel combustion, to a connecting rod.

The piston is a component constituting a part of a combustion chamber for combustion in an engine, and includes a head part subject to high temperature and high pressure of exploded gas, a ring part, and a skirt part. The ring part has a piston ring made of special cast iron, which is put in 2 to 4 grooves dug in the circumference of the piston. The skirt part is subject to a side thrust, and has an outer diameter somewhat smaller than an inner diameter of the cylinder, against thermal expansion. The piston ring not only performs a role of maintaining the airtightness between the piston and the cylinder, but also scrapes off engine oil (or lubricant oil) on the cylinder.

While the piston compresses air, an exhaust gas is generated by combustion through fuel injection. The exhaust gas may move into a crank case through the lateral surface of the piston. On the other hand, the engine oil within the crank case may be moved to the combustion chamber and then combusted. The exhaust gas moving from the combustion chamber into the crank case is referred to as a blow-by gas, and the consumed amount of the engine oil moved from the inside of the crank case to the combustion chamber is referred to as an oil consumption amount.

Although the piston ring or the engine oil seals up between a cylinder wall and the piston, a gap between the cylinder wall and the piston cannot help but exist. Through such a gap, a trace amount of mixed gas is leaked into the crank case during compression stroke of the engine. The blow-by gas discharged to the crank case is transferred to a head cover.

When the blow-by gas stays within the crank case, the pressure within a crank is increased. This increases oil leakage at respective sealing portions, and deteriorates the engine oil. For this reason, the blow-by gas passes through an oil separator. Then, the oil is collected by the oil separator, while the blow-by gas, from which the oil has been separated, is sent again to an intake manifold, and is then supplied and re-combusted, together with the intake air, in the combustion chamber, or simply discharged to the atmosphere.

An increase in both the blow-by gas and the oil consumption has a bad effect on the performance of the engine. When the oil consumption increases, a financial burden is increased, thereby causing dissatisfaction of consumers. Also, when the blow-by gas is instable, oil consumption increases due to instable behavior of the piston ring, or the performance of a closed crankcase ventilation (CCV) system becomes low due to instability of the internal pressure of the crank case. Especially, in a case where a filter-type CCV is used, such instability has an effect on the life of a filter, which increases a financial burden of the consumers, thereby causing dissatisfaction of them.

Figure 1:
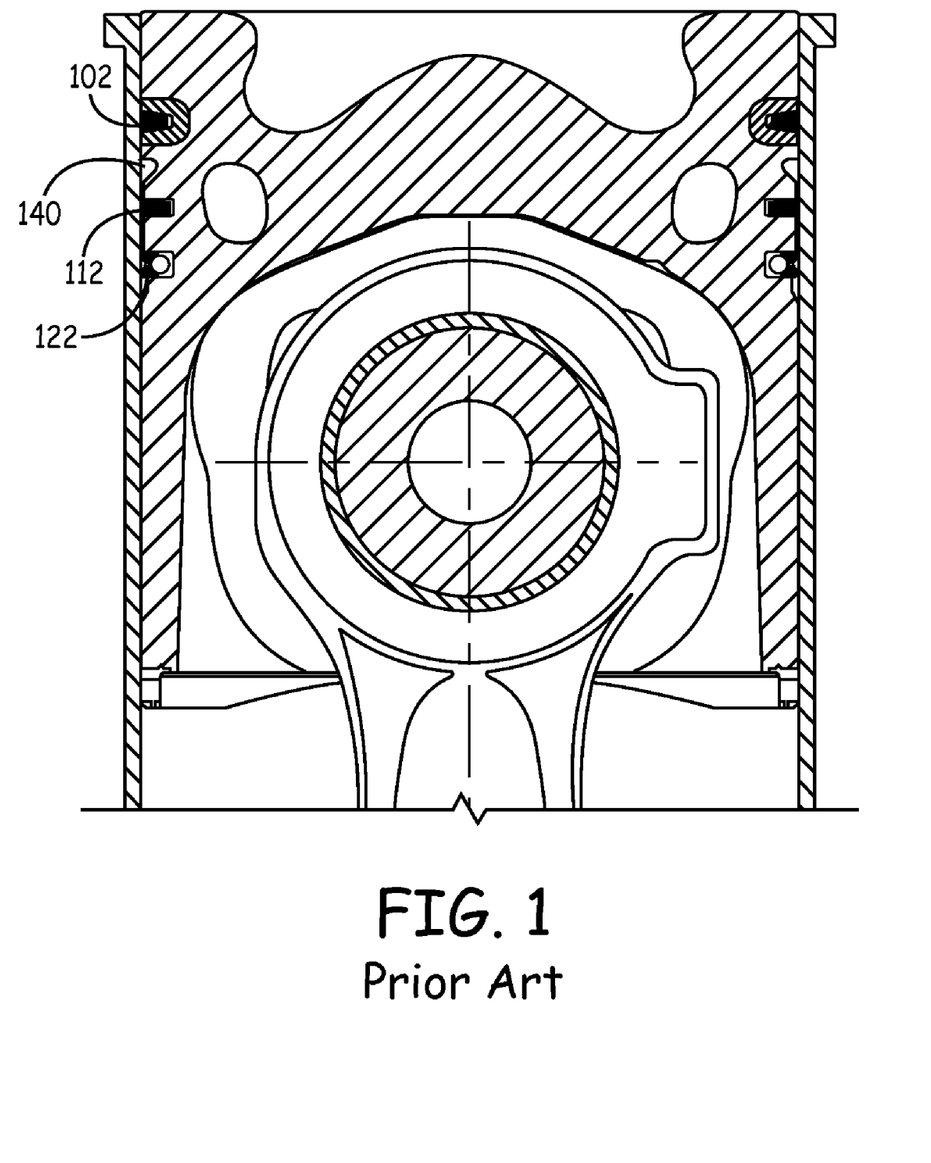
FIG. 1 shows a cross-sectional view illustrating a conventional piston of a diesel engine.
Figure 2:
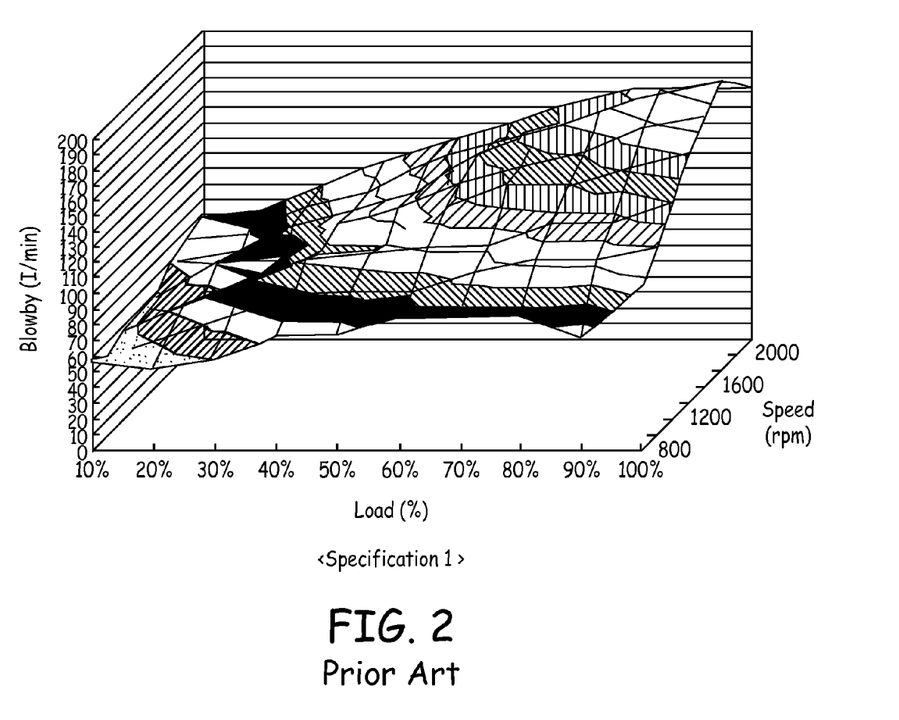
FIG. 2 shows a graph showing press fluctuation of a blow-by gas in an 8-liter grade diesel engine employing the piston shown in FIG. 1.
Figure 3:
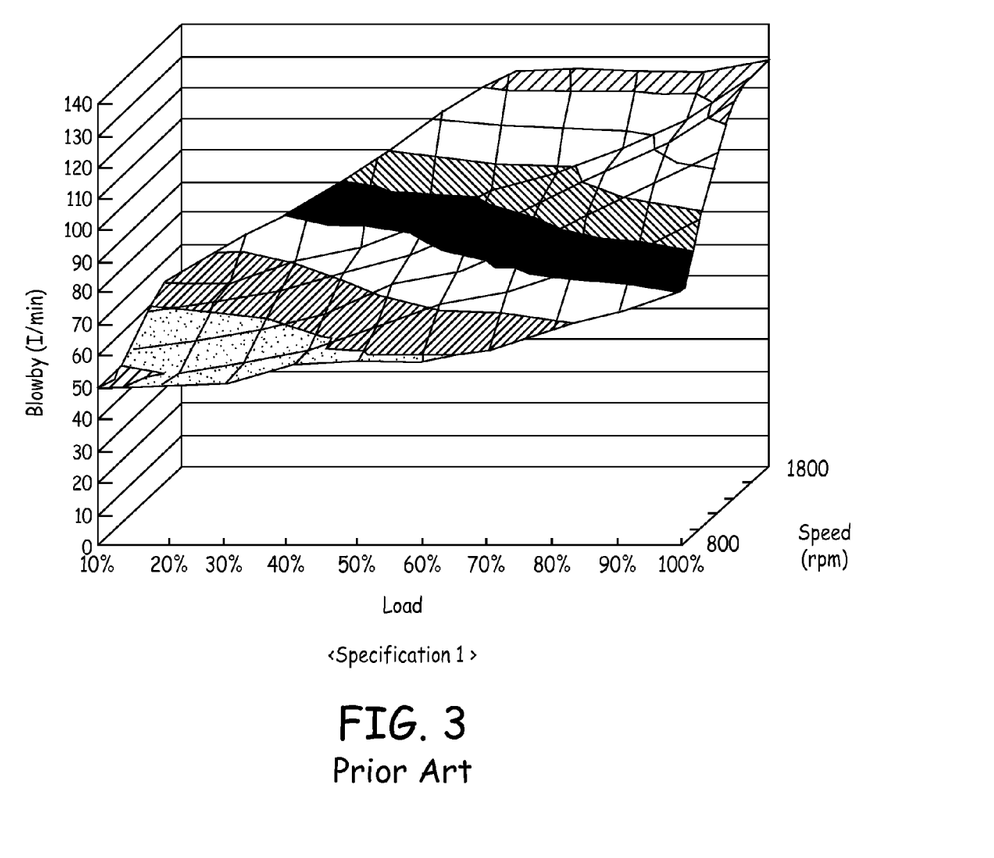
FIG. 3 shows a graph showing press fluctuation of a blow-by gas in an 11-liter grade diesel engine employing the piston shown in FIG. 1.

FIG. 1 shows a conventional piston of a diesel engine. Referring to FIG. 1, the conventional piston for the diesel engine includes an upper ring 102, a middle ring 112, and an oil ring 122, provided therewithin. Between the upper ring 102 and the middle ring 112, a ring-shaped groove 140 is formed, and there are small gaps between the upper/lower ends of the ring-shaped groove 140, and a liner. FIGS. 2 and 3 show graphs illustrating pressure fluctuations of a blow-by gas in 8-liter grade and 11-liter grade diesel engines which employ the piston shown in FIG. 1.

Referring to FIGS. 2 and 3, although a conventional piston for a diesel engine has the ring-shaped groove 140 between the upper ring 102 and the middle ring 112, the gaps between the upper/lower ends of the ring-shaped groove 140, and the liner are the same as each other, and relatively small. Thus, the blow-by gas coming out from the combustion chamber via the upper ring 102 stays between the upper ring 102 and the middle ring 112, and forms a pressure, which destabilizes the behaviors of the upper ring 102 and the middle ring 112. This destabilizes the behavior of the blow-by gas coming into the crank case via the middle ring 112, thereby causing non-uniformity of a change in a pressure diagram of the blow-by gas, and increasing the consumption of oil.

Meanwhile, as another example of a conventional technology, Japanese Patent Publication No. 2001-214804 discloses a technology on a piston having a step-shaped ring-shaped groove formed between an upper ring and an oil ring. In the piston according to the conventional technology, since the ring-shaped groove between the upper ring and the oil ring is formed in a step shape with a wider upper space and a narrower lower space, there is a problem in that oil staying in the upper portion of the ring-shaped groove cannot smoothly flow down to the oil ring by being subjected to resistance of the height of the step. Also, such a structure results in an increase in oil consumption, and a decrease in capability of reducing a blow-by gas.

As a further example of a conventional technology, Japanese Patent Publication No. 2001-214805 discloses a technology on a piston having a wedge-shaped ring-shaped groove formed between an upper ring, and an oil ring. Since the piston according to the conventional technology has a structure when the ring-shaped groove between the upper ring and the oil ring is formed into a wedge shape with a wider upper space and a narrower lower space, it is impossible to secure a sufficient amount of oil in the upper portion of the ring-shaped groove. Thus, there is a problem in that oil in the upper portion cannot smoothly flow down to the oil ring. Also, in a case where such a wedge-shaped ring-shaped groove is designed with a large size, an area between from the end of the ring-shaped groove to the oil ring becomes smaller, thereby reducing the controllability of a blow-by gas. Accordingly such a structure results in an increase in oil consumption, or a decrease in capability of controlling a blow-by gas.

The discussion above is merely provided for general background information and is not intended to be used as an aid in determining the scope of the claimed subject matter.

SUMMARY

This Summary and the Abstract are provided to introduce a selection of concepts in a simplified form that are further described below in the Detailed Description. The Summary and the Abstract are not intended to identify key features or essential features of the claimed subject matter, nor are they intended to be used as an aid in determining the scope of the claimed subject matter.

Accordingly, disclosed embodiments address the above-mentioned problems occurring in the prior art, and the disclosed embodiments provide a piston for an engine having a stable behavior of a piston ring, which can stabilizes a blow-by gas passing through between the piston ring and a cylinder wall, and reduce oil consumption.

In accordance with an aspect of a disclosed embodiment, there is provided a piston for an engine having a stable behavior of a piston ring, the piston including: an upper ring, a middle ring, and an oil ring, provided in an outer circumferential portion; and a ring-shaped groove formed between the upper ring, and the middle ring, wherein the ring-shaped groove has a deep portion which has a concave shape so as to oil staying in the ring-shaped groove to be uniformly smoothly flowed, a straight-lined shaped first gap is formed between a liner of a cylinder, and an area from the ring-shaped groove to the middle ring, and the first gap is larger than a gap between the liner of the cylinder, and an area from a portion provided with the upper ring to the ring-shaped groove.

Also, in a disclosed embodiment, a straight-line shaped second gap is further formed in an area from the middle ring to the oil ring, and the second gap is larger than a gap between the liner of the cylinder, and the area from the portion provided with the upper ring to the ring-shaped groove.

Also, in exemplary disclosed embodiments, the first gap and the second gap, formed between the liner of the cylinder, and the piston, have a size of 0.5 to 3 mm, respectively.

Also, in exemplary disclosed embodiments, the first gap and the second gap have a size of 0.5 to 2 mm, respectively.

Also, in exemplary disclosed embodiments, the first gap and the second gap are differently formed from each other.

Also, in exemplary disclosed embodiments, when the first gap and the second gap are differently formed from each other, the second gap has a size of 0.5 to 1.5 mm.

Also, in exemplary disclosed embodiments, a ratio of a longest distance between the ring-shaped groove and the liner, to the first gap or the second gap, ranges from 7:1 to 7:5.

Also, in exemplary disclosed embodiments, an internal upper surface of the ring-shaped groove is curved or slightly inclined.

Also, in exemplary disclosed embodiments, a lower surface within the ring-shaped groove is formed with a steeply downward slope.

Also, in exemplary disclosed embodiments, the deep portion (or bottom surface) of the ring-shaped groove is curved.

Also, in exemplary disclosed embodiments, the first gap and the second gap have a size of 1 to 3 mm, respectively.

In disclosed embodiments, it is possible to adjust the amount of a blow-by gas, which is a mixed gas flowed into a crank case from a combustion chamber by passing through a gap between the cylinder and the piston, formed below the ring-shaped groove, thereby stabilizing the behavior of the blow-by gas.

Also, the stabilization of the behavior of the blow-by gas stabilizes the behavior of the upper ring inserted in the upper body, thereby reducing the amount of oil scraped off toward the combustion chamber by the upper ring. This can reduce oil consumption.

Also, it is possible to stabilize the behavior of the middle ring inserted in the middle body, and to smoothly scrape off the oil on the inner wall of the cylinder toward the crank case through the space formed below the ring-shaped groove. This reduces the oil remaining on the inner wall of the cylinder, and thereby reduces the oil consumption caused by evaporation.

Also, it is possible to stabilize the crank case's internal pressure caused by the blow-by gas, thereby improving the durability of a blow-by gas processing apparatus for processing the blow-by gas.

Also, it is possible to prevent the oil from flowing toward the combustion chamber, to prevent the gas from leaking in the combustion chamber, and to stabilize the behavior of the piston ring.

BRIEF DESCRIPTION OF THE DRAWINGS

The above and other inventive aspects, features and embodiments of the present disclosure will be more apparent from the following detailed description taken in conjunction with the accompanying drawings, in which.

DETAILED DESCRIPTION OF THE EXEMPLARY EMBODIMENTS

Hereinafter, an embodiment of a piston for an engine having a stable behavior of a piston ring, will be described with reference to FIGS. 4 to 7.

In the description, thicknesses of lines or sizes of components, shown in the drawings may be exaggerated for clarity of explanation and convenience of understanding. Also, terms that will be described below are defined in consideration of functions in the present invention, which may vary according to a user, a purpose of an operator, or usage.

Figure 4:
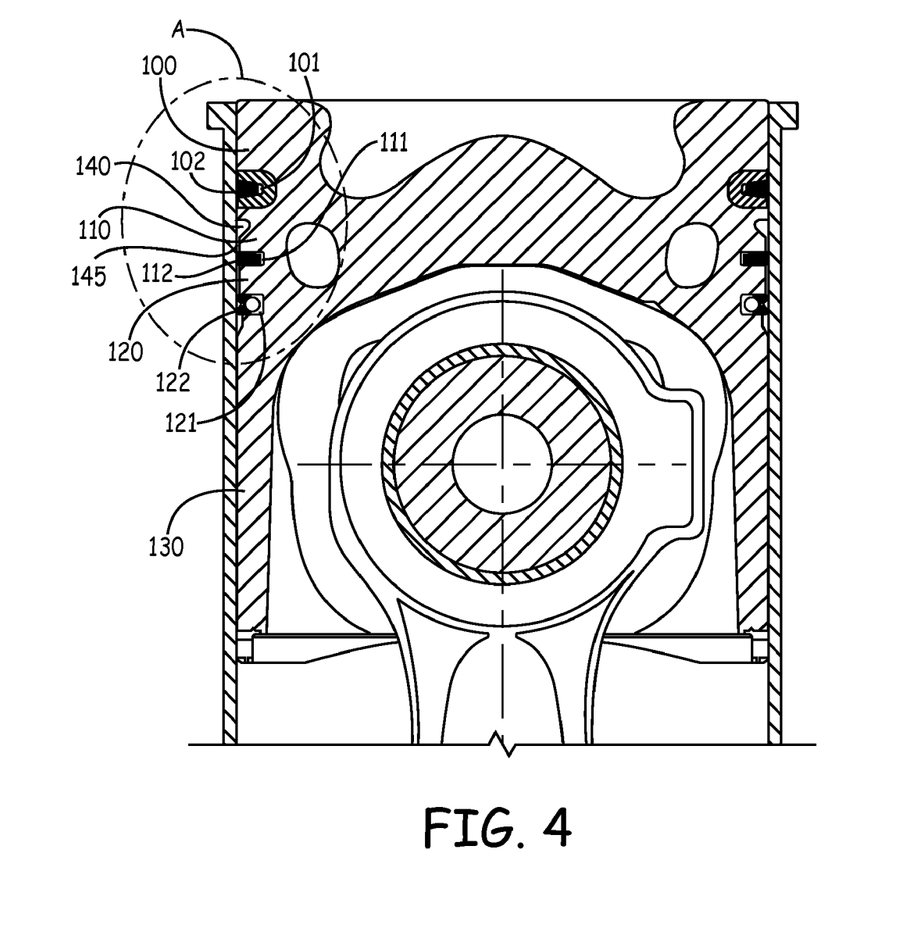
FIG. 4 shows a cross-sectional view illustrating a piston for a diesel engine having a stable behavior of a piston ring, according to a disclosed embodiment.
Figure 5:
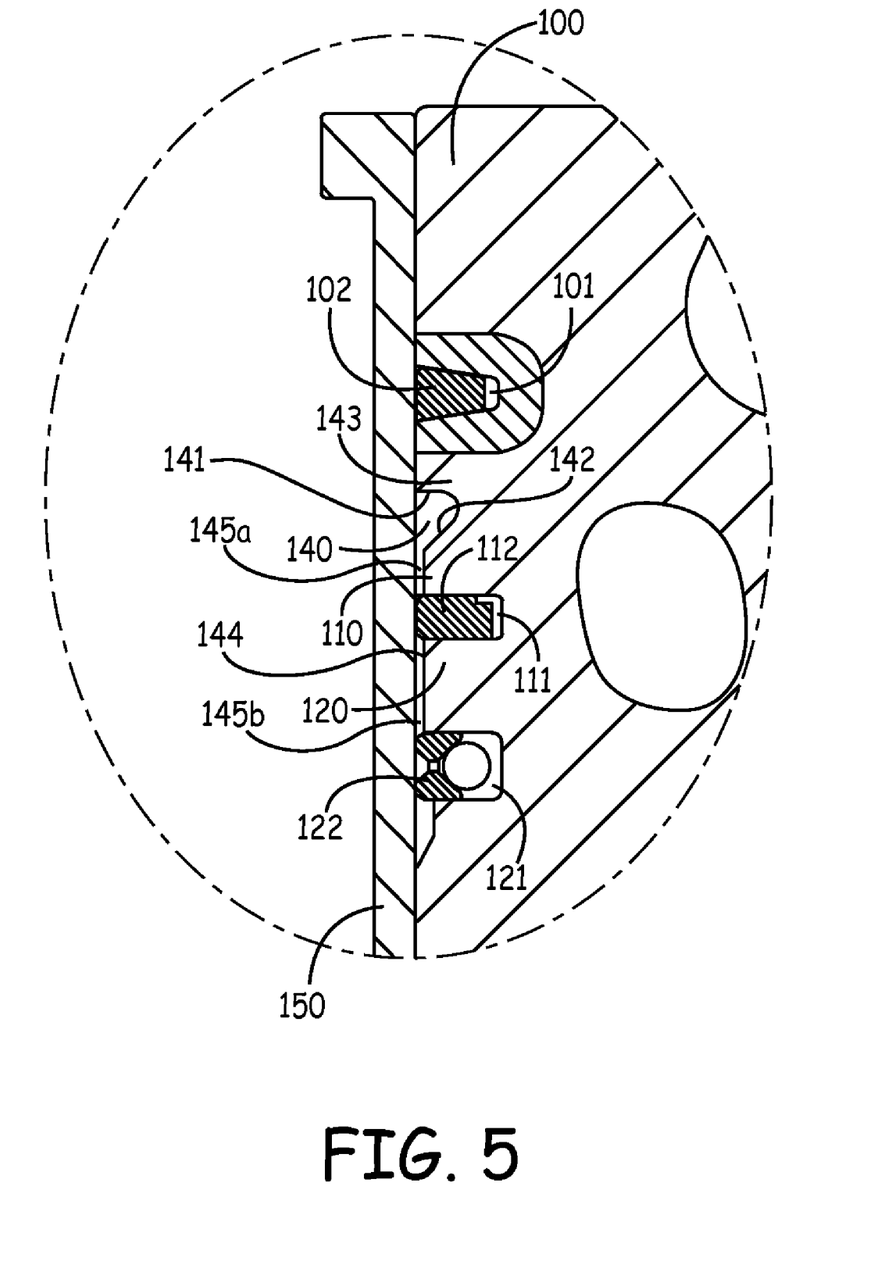
FIG. 5 shows an enlarged view of a part A in FIG. 4.

FIG. 4 shows a cross-sectional view illustrating a piston for a diesel engine having a stable behavior of a piston ring, according to a disclosed embodiment, and FIG. 5 shows an enlarged view of a part A in FIG. 1.

Referring to FIG. 4, a piston for an engine having a stable behavior of a piston ring, according to a disclosed embodiment, includes an upper body 100, a middle body 110, a lower body 120, and a connecting rod connection 130 for a connecting rod, which are integrally formed.

In the lower outer circumferential portion of the upper body 100, a ring-shaped groove 101 is formed, and in the groove, an upper ring 102 is inserted. Also, in the lower outer circumferential portion of the middle body 110, a ring-shaped groove 111 is formed, and in the groove, a middle ring 112 is inserted. Also, in the lower outer circumferential portion of the lower body 120, a ring-shaped groove 121 is formed, and in the groove, an oil ring 122 is inserted. The upper ring 102, the middle ring 112, and the oil ring 122 are piston rings of the piston, and more rings may be inserted according to the specifications (or models) of an engine.

Herein, in the middle body 110, a ring-shaped groove 140 having a concave-shaped deep portion is further formed where a ring is not inserted. A straight-line shaped (or a straight-line cross-sectional shaped) gap 145 is formed between a liner of a cylinder, and an area from the ring-shaped groove 140 formed in the middle body 110 to the oil ring 122 inserted in the lower body 120. Herein, the gap 145 is larger than a minute gap between the liner 150 of the cylinder, and an area from the upper ring 102 to the ring-shaped groove 140. Since the deep portion of the ring-shaped groove 140 has a concave shape, it is possible to store and flow a large amount of oil, and to store a large amount of oil by using only a minimum area between the upper ring and the middle ring. Thus, a very high controllability of a blow-by gas can be achieved. When the ring-shaped groove 140 occupies a large area between the upper ring and the middle ring, there is a problem in that the area of a gap 145a for flow control of the blow-by gas is reduced.

Referring to FIGS. 4 and 5, the ring-shaped groove 140 has an internal upper surface 141 which is flat or slightly slanted, and a lower surface 142 which faces the upper surface and is largely slanted downward, so that oil on the inner wall of the cylinder can be easily scraped off toward the crank case below the cylinder. In other words, the oil scraped off by an upper portion 143 of the ring-shaped groove 140 is flowed in the ring-shaped groove 140, and is moved toward the crank case from the inner wall of the cylinder while being on the ring-shaped groove 140.

Herein, between the lower portion of the ring-shaped groove 140, and the liner, the gap 145 is formed, as described above. The blow-by gas and the oil can be flowed in, and stored or passed through the gap. The blow-by gas is flowed toward the crank case while passing through the middle ring 112 and the oil ring 122 via the gap 145 formed below the ring-shaped groove 140.

Herein, the gap 145 is not formed at the upper portion 143 of the middle body 110, but formed at a lower portion 144. The gap 145 is divided into a straight-shaped (or straight-cross sectional) first gap 145a from the ring-shaped groove 140 to the middle ring 112, and a straight-shaped (or straight-cross sectional) second gap 145b from the middle ring 112 to the oil ring 122. The first gap 145a connects the ring-shaped groove 140 to the second gap 145b via the middle ring 112, thereby allowing the blow-by gas and the oil to be smoothly flowed from the ring-shaped groove 140 side to the second gap 145b side.

Meanwhile, the first gap 145a and the second gap 145b may be formed with a size of 0.5 to 3 mm, respectively. More preferably, the first gap 145a and the second gap 145b may be optimized with a size of 0.5 to 2 mm, or a size of 1 to 3 mm, respectively. Herein, the first gap 145a and the second gap 145b may be differently formed from each other. When the first gap 145a and the second gap 145b are different from each other, the second gap 145b may have a size of 0.5 to 1.5 mm. This stabilizes the blow-by gas, and reduces the consumption of oil. The first gap 145a or the second gap 145b has a size corresponding to a half of a diameter difference value obtained by subtracting the outside diameter of the piston's corresponding portion, from the inside diameter of the liner 150 of the cylinder.

When each gap (the first gap, or the second gap) is 3 mm or more, the portion upwardly/downwardly supporting the middle ring 112 is reduced, thereby destabilizing behavior of the middle ring 112. On the other hand, when each gap (the first gap, or the second gap) is 0.5 mm or less, such a size is not enough to control and stabilize the blow-by gas. Thus, there may be no effect on the reduction of oil consumption.

The ratio of the longest distance from the ring-shaped groove 140 to the liner 150, to the gap 145, ranges from 7:1 to 7:5. The gap 145 between the ring-shaped groove 140 and the liner 150 is fixed with a size of 7 mm in the disclosed embodiment. The internal upper surface 141 of the ring-shaped groove 140 may have a curved shape or a slightly inclined shape. Such a curved structure or an inclined structure of the internal upper surface 141 stabilizes the flow of the blow-by gas, and reduces the consumption of oil. Meanwhile, the lower surface 142 within the ring-shaped groove 140 may be formed with a steeply downward slope while the deep portion (or a bottom surface) of the ring-shaped groove 140 may be curved. Such a structure of the ring-shaped groove may allow a large amount of oil to be stored and flowed.

As described above, since there is provided the gap 145 for allowing the blow-by gas and the oil to be flowed toward or stored in the crank case, pressure fluctuation of the blow-by gas is reduced, and behavior fluctuation of the upper ring 102 and the middle ring 112, caused by the blow-by gas, is reduced, compared to the case when there is no gap 145 below the ring-shaped groove 140.

Accordingly, a minute change in the shape of the upper ring 102 according to the behavior of the upper ring 102 is reduced, and thereby it is possible for the upper ring 102 to more perfectly maintain its airtight state against the inner wall of the cylinder. Also, when the piston is placed in a compression state while moving to the upper portion of the liner 150, the amount of oil scraped off from the inner wall of the cylinder, by the upper ring 102, is reduced.

When the combustion chamber formed between the piston and the cylinder is placed from a compressed state to an explosion state, a large amount of blow-by gas can stay in the gap 145 formed below the ring-shaped groove 140. Thus, pressure fluctuation is reduced, and the blow-by gas can be stably and smoothly moved downward, which stabilizes the behavior of the middle ring 112 inserted in the middle body 110.

Since the behavior of the middle ring 112 is stabilized, and the gap 145 is provided below the ring-shaped groove 140, it is possible to smoothly scrape off the oil on the inner wall of the cylinder, toward the crank case side. Furthermore, it is possible to reduce the consumption of oil, caused by evaporation, because the amount of the oil remaining on the inner wall of the cylinder is reduced. Herein, since the internal pressure of the crank case, caused by the blow-by gas, is stabilized, it is possible to improve the durability in a blow-by gas processing apparatus for processing the blow-by gas.

Figure 6:
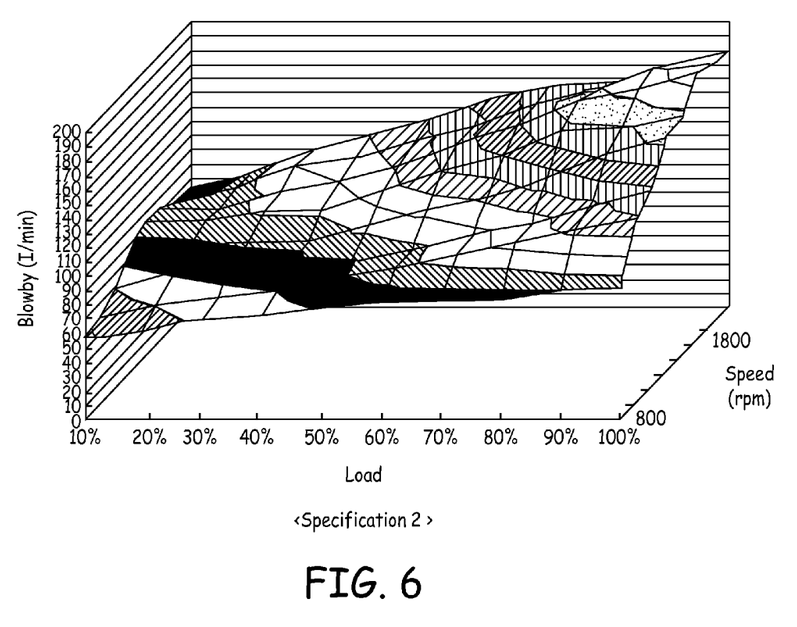
FIG. 6 shows a graph illustrating the behavior of a blow-by gas in an 8-liter grade engine employing a piston for a diesel engine having a stable behavior of a piston ring, according to a disclosed embodiment.
Figure 7:
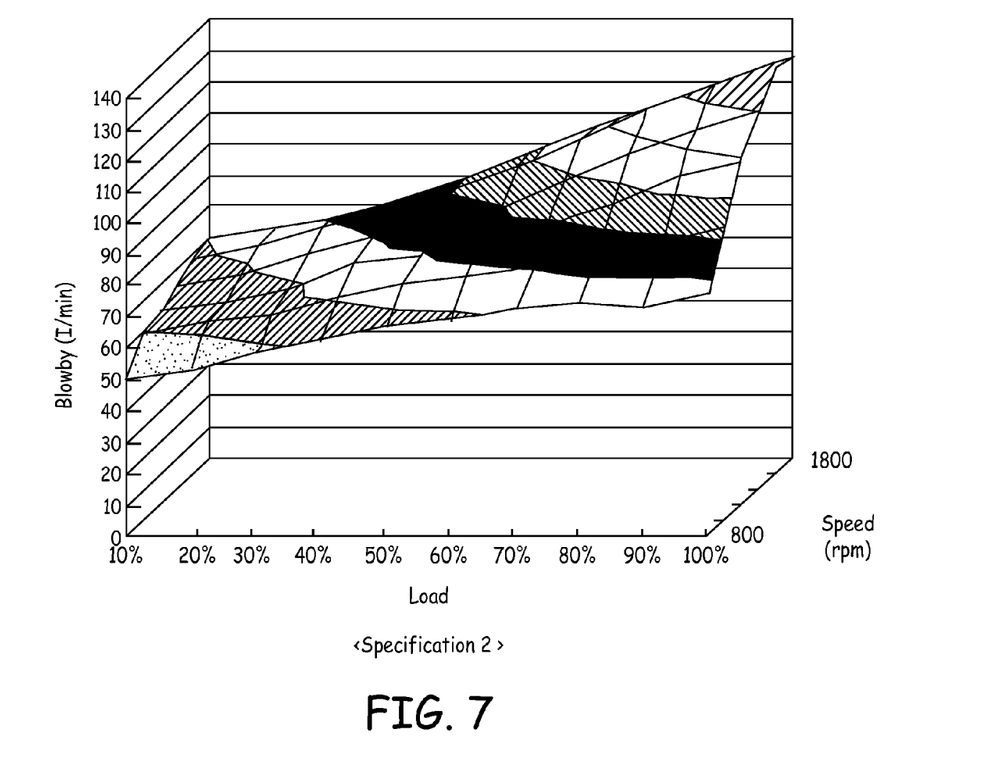
FIG. 7 shows a graph illustrating the behavior of a blow-by gas in an 11-liter grade engine employing a piston for a diesel engine having a stable behavior of a piston ring, according to a disclosed embodiment.

FIG. 6 shows a graph illustrating the behavior of a blow-by gas in an 8-liter grade engine employing the piston for a diesel engine having a stable behavior of a piston ring, according to a disclosed embodiment, and FIG. 7 shows a graph illustrating the behavior of a blow-by gas in an 11-liter grade engine employing the piston for a diesel engine having a stable behavior of a piston ring, according to a disclosed embodiment.

Referring to FIGS. 2 and 3, as a result of the test on the 8-liter grade engine and the 11-liter grade engine, a difference of the amounts of the blow-by gas according to a load was non-uniform in specification (or model) 1. On the other hand, referring to FIGS. 5 and 6, in the case of specification 2, a change in the blow-by gas according to a load was uniform. Also, as noted in Table 1, it was determined that oil consumption was reduced by 81% and 34%, respectively.

TABLE 1

|  | Specification 1 | Specification 2 | Change in oil consumption |
|---|---|---|---|
| 8-liter grade engine | 8.58 l/100 hr | 1.60 l/100 hr | Reduction of 81% |
| 11-liter grade engine | 3.57 l/100 hr | 2.36 l/100 hr | Reduction of 34% |

Herein, in the case of specification 1, only a ring-shaped groove exists on a generally used piston body, which has a uniform gap between its upper/lower ends and a liner. Meanwhile, in the case of specification 2, a ring-shaped groove on a middle body has a first gap 145a between its lower end and a liner, which is 0.5 mm larger than another gap between its upper end and the liner.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A piston for an engine having a stable behavior of a piston ring, the piston comprising:
   a body positionable in a cylinder;
   an upper ring, a middle ring, and an oil ring, which are provided at an outer circumferential portion of the body; and
   a ring-shaped groove in the body formed between the upper ring and the middle ring,
   wherein the ring-shaped groove has a deep portion which has a concave shape so that oil staying in the ring-shaped groove is uniformly smoothly flowed, and further comprising a first gap, having a shape of a straight line, formed between substantially parallel portions of a liner of the cylinder and an area of the body extending from the ring-shaped groove to the middle ring, and wherein the first gap is larger than a gap between the liner of the cylinder and an area of the body extending from a portion of the body adjacent the upper ring to the ring-shaped groove, and further comprising a second gap, having a shape of a straight line, formed between substantially parallel portions of the liner of the cylinder and an area of the body extending from the middle ring to the oil ring, and wherein the second gap is larger than the gap between the liner of the cylinder and the area extending from the portion of the body adjacent the upper ring to the ring-shaped groove.

2. The piston for the engine having the stable behavior of the piston ring as claimed in claim 1, wherein the first gap and the second gap formed between the liner of the cylinder and the piston each have a size in the range of 0.5 to 3mm.

3. The piston for the engine having the stable behavior of the piston ring as claimed in claim 2, wherein the first gap and the second gap each have a size in the range of 0.5 to 2mm.

4. The piston for the engine having the stable behavior of the piston ring as claimed in claim 1, wherein the first gap and the second gap are differently formed from each other to have different sizes.

5. The piston for the engine having the stable behavior of the piston ring as claimed in claim 1, wherein when the first gap and the second gap are differently formed from each other to have different sizes, the second gap has a size in the range of 0.5 to 1.5mm.

6. The piston for the engine having the stable behavior of the piston ring as claimed in claim 1, wherein a ratio of a longest distance between the ring-shaped groove and the liner with respect to the first gap or the second gap ranges from 7:1 to 7:5.

7. The piston for the engine having the stable behavior of the piston ring as claimed in claim 1, wherein an internal upper surface of the ring-shaped groove is curved or slightly inclined.

8. The piston for the engine having the stable behavior of the piston ring as claimed in claim 1, wherein a lower surface within the ring-shaped groove is formed with a steeply downward slope.

9. The piston for the engine having the stable behavior of the piston ring as claimed in claim 1, wherein the deep portion of the ring-shaped groove is curved.

10. The piston for the engine having the stable behavior of the piston ring as claimed in claim 2, wherein the first gap and the second gap each have a size in the range of 1 to 3mm.

11. The piston for the engine having the stable behavior of the piston ring as claimed in claim 1, wherein a ratio of a longest distance between the ring-shaped groove and the liner with respect to the first gap or the second gap ranges from 7:1 to 7:5.

12. The piston for the engine having the stable behavior of the piston ring as claimed in claim 1, wherein an internal upper surface of the ring-shaped groove is curved or slightly inclined.

* * * * *